United States Patent Office 3,557,607
Patented Jan. 26, 1971

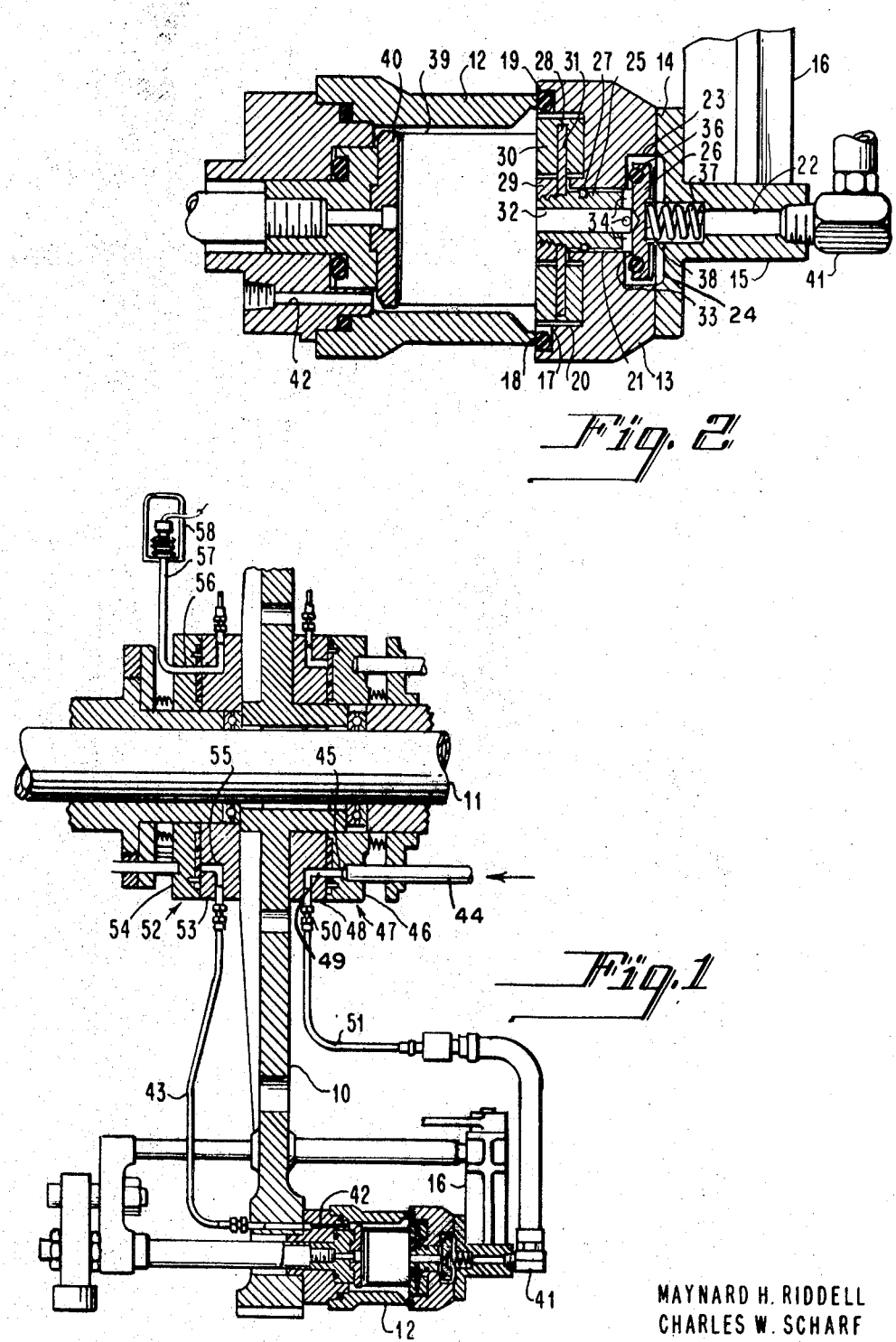

3,557,607
CONTROL VALVE FOR CAN TESTING
APPARATUS
Maynard Harry Riddell, Randolph, and Charles William Scharf, Salamanca, N.Y., assignors to Borden, Inc., New York, N.Y., a corporation of New Jersey
Filed Feb. 24, 1969, Ser. No. 801,571
Int. Cl. G01m 3/32
U.S. Cl. 73—49.2
4 Claims

ABSTRACT OF THE DISCLOSURE

A can testing apparatus having a plurality of chambers in association with turntable, a station where air is injected into a can within a chamber and a station where the can is tested for leaks. A chamber closure is provided having a valve which is responsive to the presence of a can in a chamber to allow the injection of air into the can. Since the chamber closure valve is responsive only to the presence of a can it protects the delicate leak detector from high pressures.

BACKGROUND OF THE INVENTION

Heretofore, numerous testing apparatus have been devised to detect leaks in continuously supplied cans by positioning and sealing each can into one of several cylindrical chambers spaced about a rotatable spider wheel, injecting a gas under pressure into the can and measuring the pressure buildup in the chamber occasioned by gas seepage through the can walls. Conventional sensing apparatus is generally used to detect chamber pressure changes and conveys an appropriate signal to the sorting apparatus of the tester to reject a leaky can. Typical examples of the known apparatus are disclosed in the patents to Cameron (U.S. Pat. No. 2,101,129) and Roberts et al. (U.S. Pat. No. 3,198,004).

Although the results of the known testers have been mostly satisfactory, one problem has persisted in operation when the supplying apparatus fails to insert a can into each test chamber. Specifically, when gas is injected into the empty chamber, an abnormally high pressure accumulates which damages the delicate sensing apparatus when the latter communicates with the chamber to detect pressure changes. Since the sensor is designed to detect minute gas seepage into the chamber from the can, the damage is usually permanent and replacement is required. Unfortunately, such sensing equipment is expensive and periods of machine shutdown are costly in terms of idle labor and replacement costs.

Moreover, the excessive buildup of pressure in an empty chamber during testing subjects the other elements of the tester to uncommonly large stresses, thereby causing damage to the bearings and conduit fittings in addition to shortening the life of the tester.

SUMMARY OF THE INVENTION

The present invention overcomes the stated deficiencies in the prior art of container testing and has as its primary objective the provision of a control valve for each chamber of the cam tester which precludes the injection of gas when the chamber is empty. More particularly, the present invention relates to a control valve displacable by a can positioned within the chamber to effect communication of the can interior with the gas supply.

Briefly stated, the present invention relates to apparatus for testing cans in a chamber, means for supplying high-pressure gas to said chamber and to said cans disposed therein, exhaust means for permitting the escape of gas from said chamber, sensing means responsive to the exhaust discharged from the chamber to detect the presence of leaks in said cans, first valve means interposed between said chamber and said gas supply means, second valve means interposed between said chamber and said sensing means, said first and second valve means being operatively associated whereby communication of said gas supply means to said chamber occurs subsequent to communication of said chamber with said sensing means, and third valve means interposed between said first valve means and said chamber responsive to the presence of a can within said chamber to permit the passage of gas thereinto.

BRIEF DESCRIPTION OF THE DRAWING

The various features of the apparatus of this invention will become apparent from the following detailed description set forth in connection with the accompanying drawing which relates to the preferred embodiment of the present invention and is given by way of illustration.

FIG. 1 is a longitudinal cross-setcion view of the can tester apparatus.

FIG. 2 is a cross-section view of one of the test chambers of the present invention.

DETAILED DESCRIPTION OF THE INVENTION

Referring to the preferred embodiment of the present invention in FIG. 1, a circular spider or turntable 10 rotates about a fixed shaft 11 and is driven about a horizontal axis by motor means (not shown). A plurality of cylindrical chambers 12 are angularly spaced on the turntable near the periphery and are disposed in axially parallel relation to shaft 11. Although only one chamber will be described in detail hereinafter, it should be appreciated that the structure explained is common to all chambers. Each chamber is passed through a can-inserting station and a can-discharge station to sort the leaky from the usable cans which forms no part of the present invention and may be found, for example, in the disclosure of Pat. No. 2,013,402 to Cameron.

Referring to the detailed view in FIG. 2, each chamber is provided with a closure cap 13 bolted to the arcuate flange 14 of hollow cylinder 15. The latter member is adjustably secured to brace 16 of the tester which advances the cap 13 to close the open end of the chamber 12 in timed response to the can-insertion step of the testing operation as shown in the Cameron patent.

An annular notch 17, concentric with the cap axis, is provided in the face aligned with circular rim 18 of the chamber into which is positioned conventional O-ring 19, the latter adapted to sealingly abut the chamber rim and thus hermetically seal the interior from the atmosphere. A circular cavity 20 is provided on the same cap face and merges with axial bore 21 which is aligned and concentric with longitudinal bore 22 in cylinder 15. The reverse face of the cap 13 is provided with a circular cavity 23 which also merges and is concentric with the bore 21. A cut-out portion in flange 14 faces and is diametrically equal to cavity 23 and includes counterbore 24 concentric with the longitudinal bore 22.

A spool 25 having an integral circular flange 26 is slidably disposed in the bore 21 with the flange received in cavity 23 and is mounted with conventional O-rings 27 for reciprocal movement. The free end of the spool is reduced in diameter to define a shoulder on which is positioned a circular disk 28 having a central aperture dimensionally equal to the reduced portion of the spool. The disk is retained against the shoulder by nut 29 which engages conventional threads on the reduced portion.

A circular rubber disk 30 having a central aperture greater in diameter than nut 29 is provided with a radially extending annular recess 31. The disk 28 is received within the groove and forms a force fit to rigidly retain the rubber disk for movement with the spool 25.

The spool 25 is additionally provided with an axial bore 32 which terminates in flange 26. A plurality of angularly spaced ports 34 intersect the bore at right angles and open outwardly of the spool adjacent the shoulder 33 defined by flange 26, the latter surface being adapted to form an interface with the vertical face of cavity 23. An annular recess is provided in shoulder 33 in which is positioned a conventional O-ring 36 to form a circular seal at the interface. A spring 37, disposed in the counterbore 24, is received in recess 38 on the outer face of the flange 26 and maintains a constant bias on the spool to effect sealing by ring 36 at the interface and thereby preclude communication of ports 34 with cavity 23.

When a can 39 is positioned within the chamber on base 40 by the can-inserting apparatus of the tester, cap 13 is advanced to the closed position, whereby ring 19 abuts rim 18 to hermetically seal the chamber. The can rim engages the rubber disk 30 and displaces the spool 25, against the bias of spring 37, in the direction of cylinder 15 to move the flange 26 out of contact with the vertical face of cavity 23 and allow the ports 34 to communicate via recess 23 and counterbore 24, with axial bore 22. A conventional conduit fitting 41 is positioned at the open end of bore 22 to deliver high-pressure gas into the can from a source to be discussed.

Referring to FIG. 1, port 42 communicates via conventional fittings with conduit 43 to permit any pressure buildup in the chamber to escape. The gas injection and leakage sensing apparatus of the tester are controlled by a pair of synchronized rotary valves disposed on opposite sides of the turntable 10. The gas injection system of the tester is controlled by rotary valve 47 which comprises a fixed disk 46 juxtaposed with rotary disk 48 to form a sealed interface, therebetween, the latter disk being secured to turntable 10 to rotate in timed relation with the chambers. Fixed disk 46 is provided with an aperture 45 which is supplied with high pressure gas from a source (not shown) by conduit 44. The rotary disk 48 is provided with a plurality of L-shaped apertures 49, equal in number to the number of chambers in the tester, and the horizontal leg of each aperture opens to the valve interface and is disposed in a common radius on the disk. The aperture 45 on fixed disk 46 lies in the same radius and is aligned with each aperture for an instant during operation. A conventional fitting 50 is positioned in the vertical leg of each aperture 49 and is in turn connected to conduit 51 which is connected at its free end to fitting 41 secured in bore 22 of cylinder 15. Accordingly, when aperture 45 is aligned with one of the apertures 49, gas is supplied to the chamber which communicates via conduit 51 with that particular aperture.

The leakage detection system is controlled by rotary valve 52 which comprises rotary disk 53, secured for rotational movement to turntable 10, and fixed, juxtaposed disk 54 which forms a sealed interface with the rotary member. A plurality of L-shaped apertures 55 are provided in the rotary disk, whose horizontal leg opens to the interface and which communicate periodically during rotation with radially aligned aperture 56 of the fixed disk. A conduit 43 is connected to the vertical leg of each aperture 55 to permit communication of the chamber with aperture 56 when alignment occurs. A conventional leak detector 58, such as bellows and microswitch assembly, communicates with the aperture 56 via conduit 57; consequently, any buildup of pressure in the chamber which results from seepage of gas through the can walls activates the sensing apparatus 58 when the apertures are aligned and a signal is generated to alert the sorting apparatus to reject the leaky can.

It should be appreciated that the rotary valve 47 is out of phase with rotary valve 52 so that a dwell period, in which the pressure is maintained in the can, exists between gas injection and leak detection.

OPERATION

In operation, the can insertion apparatus is activated, cans are inserted into chamber 12, and the cap 13 closes and seals the chamber. Thus positioned, the can rim contacts the rubber disk 30, displaces the spool valve 25 by overcoming bias of spring 37 and the seal effected by contact of ring 35 at the interface of shoulder 33 is broken and ports 34 communicate with bore 22. Thus, when the L-shaped aperture 49 is aligned with the port 45 of fixed valve 47, gas is supplied to bore 22 and injected into the can. The continued rotation of the valve 48 closes the interface to port 45 and the gas pressure is maintained until the chamber is opened by retracting cap 13 to remove the can.

Prior to opening the chamber, the rotation of turntable 10 moves aperture 55 of the rotary disk 53 into alignment with aperture 56 so that a leakage detector 58 communicates via conduits 57 and 43 with the chamber 12 to detect any seepage of gas through the can walls. Obviously, if no can is inserted in the chamber, the spool valve is never displaced and no test occurs.

Although several embodiments of the present invention have been illustrated and described, it will be evident to those skilled in the art that various modifications may be incorporated into the details of production without departing from the principles herein set forth.

What is claimed is:
1. Apparatus for testing cans comprising a chamber adapted to receive said cans, means for supplying high pressure gas to said chamber into said cans disposed therein, exhaust means for permitting escape of gas from said chamber, sensing means responsive to the exhaust discharge from said chamber to detect pressure buildups due to leaks in said cans, first valve means interposed between said chamber and said sensing means, second valve means interposed between said chamber and said supply means, said first and second valve means being non-synchronously arranged whereby communication of said gas supply means with said chamber occurs before communication of said chamber with said sensing means, and third valve means interposed between said first valve means and chamber responsive to the presence of a can within said chamber to permit the passage of gas into same.

2. Apparatus according to claim 1 wherein said third valve means includes a spool displaceable between an opened and closed position, said spool being provided with a longitudinally extending bore communicable with said gas supply means in said open position.

3. Apparatus according to claim 2 wherein said spool includes a surface facing into said chamber which contacts cans positioned therein to move the valve to the open position, means positioned on the opposite end of said spool for biasing said valve to the closed position.

4. Apparatus according to claim 2 wherein said spool includes sealing means to obviate the passage of gas into said longitudinal bore in the closed position.

References Cited

UNITED STATES PATENTS

| | | | |
|---|---|---|---|
| 2,166,528 | 7/1939 | Johannes | 141—351 |
| 2,324,793 | 7/1943 | Minard | 141—286 |
| 3,198,004 | 8/1965 | Roberts et al. | 73—45.1 |

LOUIS R. PRINCE, Primary Examiner

W. A. HENRY II, Assistant Examiner